United States Patent Office 3,553,936
Patented Jan. 12, 1971

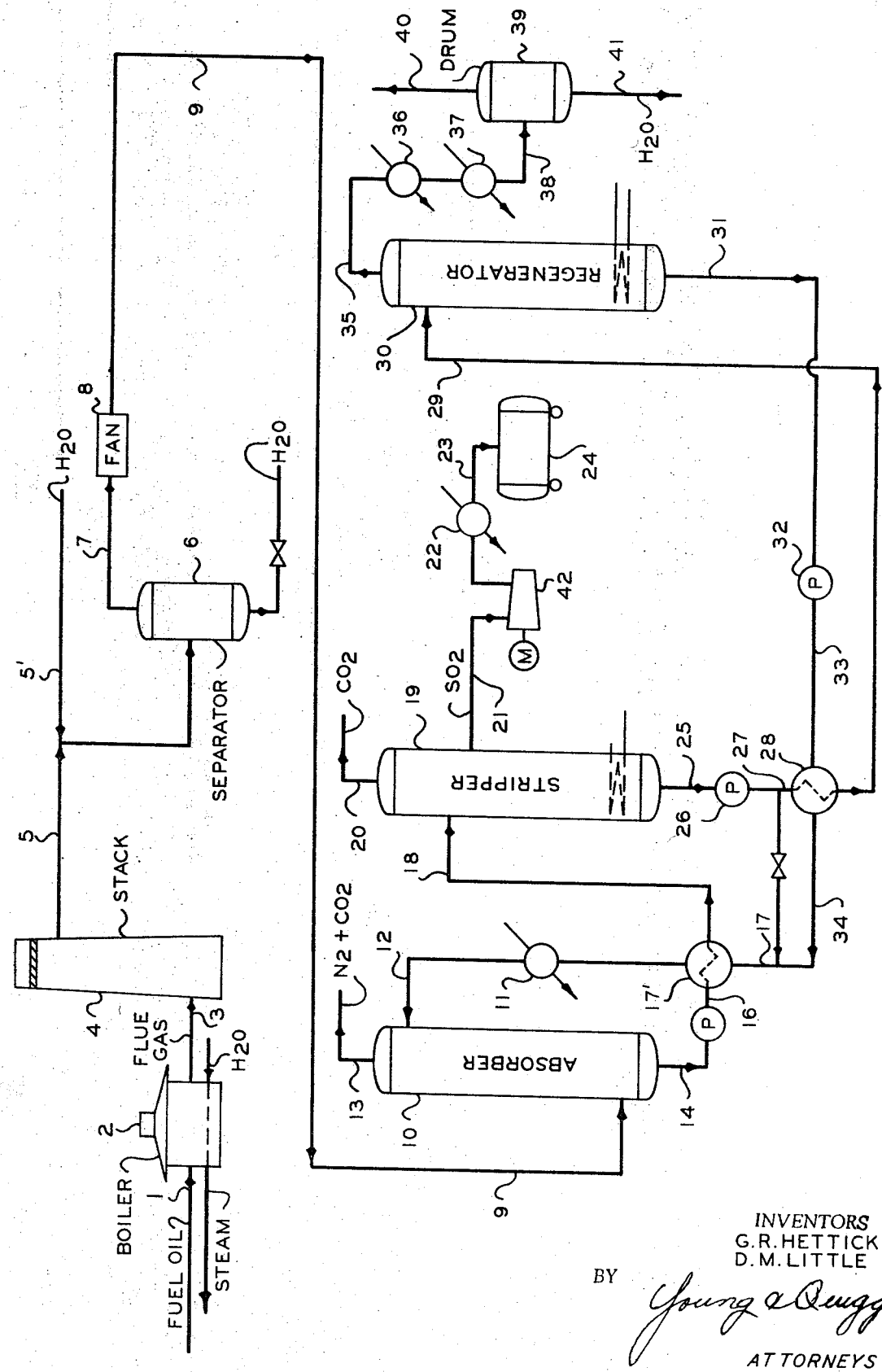

1

3,553,936
REMOVAL OF SULFUR DIOXIDE AND CARBON
DIOXIDE FROM STACK GASES
Donald M. Little and George R. Hettick, Bartlesville,
Okla., assignors to Phillips Petroleum Company, a corporation of Delaware
Filed Apr. 22, 1968, Ser. No. 722,996
Int. Cl. B01d 19/00
U.S. Cl. 55—40                                         7 Claims

ABSTRACT OF THE DISCLOSURE

Stack gases resulting from combustion of sulfur-containing fuels are treated in combination of steps to remove $SO_2$ and $CO_2$ therefrom. The gases are cooled, as by direct water quench to a suitable treatment temperature, say 150° F., then intimately contacted with an absorbent for $SO_2$ and $CO_2$, specifically a sulfolane, unabsorbed gases are vented to atmosphere or otherwise recovered. The $SO_2$-rich sulfolane stream also containing $CO_2$ is stripped as by heating to recover a lean sulfolane bottoms, which can be recycled, a side stream of $SO_2$ and an overhead stream containing the $CO_2$. For best operation, the cooled gases are compressed to a pressure of about 1 p.s.i.g. prior to the absorption step. Gases containing as little as 0.2 or less $SO_2$ mole percent can be treated to recover completely therefrom the $SO_2$ contained therein. The operation can be continuous and can be effected in a simple apparatus.

This invention relates to the recovery of sulfur dioxide. It also relates to the recovery of carbon dioxide. More specifically, in one of its aspects, the invention relates to the removal of sulfur dioxide and/or carbon dioxide containing stack gases resulting from the combustion of fuels or carbonaceous materials containing sulfur or sulfur-containing compounds. In another of its aspects, the invention relates to a combination operation in which very small proportions of sulfur dioxide are removed from stack gases containing the same. In a still further aspect, the invention relates to the removal and recovery of sulfur dioxide and/or carbon dioxide contained in stack gases which are treated to avoid pollution of the atmosphere and concomitantly to recover economic values therefrom.

In one of its concepts, the invention provides a process for the treatment of stack gases resulting from the combustion of fuels containing sulfur, such as gas, oil, coal, etc. to remove sulfur dioxide and/or carbon dioxide therefrom which comprises contacting intimately said gases with an absorbent consisting essentially of a sulfolane. In another of its concepts, the invention provides a method of treating stack gases containing sulfur dioxide and carbon dioxide and nitrogen as well as minor proportions of other gases which comprises the steps as follows: If not already cooled, then cooling the stack gases by some means, as by direct water quench, to about 150° F. while these gases are at about atmospheric pressure, passing the thus cooled gases to a water knock-out drum when water has been thus used, increasing pressure upon said gases by about 1 pound per square inch as by employment of a motor driven fan, charging the thus compressed gases to a sulfolane absorption tank maintained at about said tem-

2 perature of 150° F. and at about said pressure of 1 pound per square inch gauge, using sufficient liquid sulfolane to substantially remove all of the sulfur dioxide from the gas and unavoidably together with some carbon dioxide, passing unabsorbed gas containing nitrogen and carbon dioxide to other recovery from the sulfolane absorption step or to the atmosphere as may be desired, passing the sulfur dioxide and carbon dioxide containing sulfolane stream to a stripping step, for example, a heated stripping column, recovering carbon dioxide as an overhead, lean sulfolane as bottoms, recycling the sulfolane as desired for further use in the process, and a side stream or intermediate stream of sulfur dioxide which is removed from the stripper below the enriched sulfolane feed locus or point. In a further concept of the invention, it provides a combination of a sulfolane absorption method or system as herein described together with a sulfolane regenerator method or system wherein the water accumulated in the sulfolane is removed therefrom or from a portion thereof.

The elimination of sulfur emissions to the atmosphere when firing sulfur-containing fuels is of vital importance to air pollution control. Air pollution has been increasing and has increasingly become a national if not a global problem. A great amount of time, funds, and energy are being devoted to treatment of fuels, fuel burning systems and to treatment of combustion gases. Government bodies on the local as well as national level are continually considering the problem involved. Rather high sulfur content fuel oils can be very desirably brought into metropolitan areas at greatly reduced prices compared with regular fuel oil now being brought in. Such fuels would contain, for example, 4 to 5 percent sulfur. Processes for treating such fuels are expensive. It has been reported that the cost of desulfurization of a fuel such as Caribbean resid fuel oil to 2 percent sulfur from the present average of 2.6 percent sulfur is about 25 cents per barrel. To further reduce the sulfur content to about 1 percent would cost approximately 60 cents per barrel. To still further lower the content to about 0.5 percent would cost 80 cents to one dollar per barrel.

An operation according to the present invention, as shown in the drawing, would accomplish sulfolane absorption to remove 100 percent sulfur dioxide from generated flue gases and would cost approximately 21 cents per barrel of fuel oil. Further, allowance for by-product credit would reduce the net controllable manufacturing or treatment expense to only 11 cents per barrel.

It is an object of this invention to remove sulfur dioxide from gases containing the same. It is another object of this invention to remove carbon dioxide from gases containing the same. It is a further object of this invention to remove sulfur dioxide and/or carbon dioxide from stack gases containing the same. It is a still further object of this invention to provide a method or system wherein to continuously treat stack gases containing very small proportion of sulfur dioxide to substantially completely remove therefrom the sulfur dioxide in a highly economical manner. It is a still further object of this invention to provide a continuous system for removing sulfur dioxide and/or carbon dioxide from stack gases containing sulfur dioxide in very small proportion of the order of 1 percent or considerably less, using an absorption medium therefor which can be continuously recovered and reused.

Other aspects, concepts, and objects of the invention are apparent from a study of this disclosure, the drawing and the appended claims.

According to the present invention, there is provided a method for the removal of sulfur dioxide from stack gases containing the same in rather small proportion which comprises contacting said gases with a sulfolane.

Also according to the present invention, there is provided a process for the removal of sulfur dioxide from stack gases containing the same which comprises the steps as follows: Cooling stack gases as obtained to about a temperature at which these can be suitably compressed to a presure somewhat above atmospheric, for example, to about 16 pounds per square inch absolute, contacting the thus compressed gases with sulfolane in an amount sufficient to substantially completely absorb therefrom sulfur dioxide contained therein, passing the sulfur dioxide enriched sulfolane to a stripping zone, in the stripping zone recovering as separate streams a carbon dioxide-containing stream, a stream containing essentially only sulfur dioxide, and a bottoms containing sulfolane, and returning the sulfolane for reuse in the system. Still according to the invention, the sulfolane or a portion thereof can be passed to a sulfolane regenerator system for removal of water accumulated therein. The accumulated water can result from water vapor generated in the combustion process. Further, as now preferred, the stack gases are cooled by a water quench followed by a water knockout operation. Nevertheless, there is an increase in water vapor content of the gases and this water vapor ultimately is absorbed into the sulfolane. Accordingly, at least a portion of the sulfolane is from time to time or continuously passed to a sulfolane regenerator system in which the sulfolane is heated to a temperature at which water will be given off from the sulfolane and the sulfolane which has thus been freed of at least a portion of its water content is recovered for reuse.

Here and in the claims the term "a sulfolane" is intended to refer to tetrahydrothiophene-1,1-dioxide and to its nuclear substituted alkyl and alkoxy derivatives. These compounds have the formula:

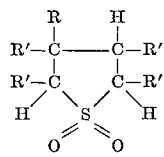

wherein R represents hydrogen or a lower alkoxy radical, each R' represents hydrogen or a lower alkyl radical and there are less than three alkyl radicals attached to the nucleus, and the compounds are selected to be in liquid form when used under the conditions of the absorption step of the process.

It is known in U.S. Pat. 2,385,704, issued Sept. 25, 1945, to employ a sulfolane for the extraction of sulfur dioxide from mixtures containing it and oxygen, nitrogen, aliphatic hydrocarbons, chloroaliphatic hydrocarbons and other ingredients which in industrial manufacturing processes are often obtained in admixture with sulfur dioxide. In the patent, experiments are reported in which a gaseous mixture consisting of 1 part by volume of sulfur dioxide and 1 part of aliphatic hydrocarbons, principally butylene, were treated.

The present invention is based upon the discovery that sulfolane will absorb sulfur dioxide even at very low partial pressures thereof and at or under conditions at which other well-known absorbents would be substantially useless. Thus, the invention is concerned primarily in its now preferred embodiment with treatment of stack gases containing less than 1 percent, indeed, considerably less than 1 percent, i.e., of the order of about 0.2 percent on a mol basis, of sulfur dioxide.

Referring now to the drawing, there is shown an installation according to the invention in which a 100,000 kilowatt generating unit boiler 2 is fed 3,500 barrels per day of fuel oil by pipe 1. This fuel oil contains just about 3 weight percent sulfur which is equivalent to 34.5 tons per day sulfur dioxide. The stack gases are passed by 3 into stack 4. Stack 4, according to the invention, is closed off at its top and the stack gases are removed therefrom by 5 into which a water quench is injected by 5'. The drawing is schematic and is not intended to show details which have been omitted for sake of simplicity. One skilled in the art in possession of this disclosure having studied the same will supply routinely the equipment or apparatus required to set up and to operate the invention on a full scale. There will result from the stack at a temperature, approximately 500° F., about 9.5 mm. standard cubic feet per hour of gas and there will be introduced as quench approximately 140 gallons of water per minute. The quenched gases now at about 150° F. are passed to water knock-out drum 6 and thence by 7 to the suction of a fan or blower 8. The pressure on the gases is increased in fan or blower 8 by about 1 pound per square inch gauge, that is to say, to about 16 pounds per square inch absolute whereupon the temperature of the gases will have been raised to about 160° F. These gases are pasesd by 9 to sulfolane absorption tower 10 to which approximately 35,600 gallons/minute of liquid sulfolane are passed at a temperature of approximately 148° F., the temperature being adjusted in cooler 11. The sulfolane enters tower 10 by pipe 12 and overhead reject or non-absorbed stream of gases containing principally nitrogen and carbon dioxide is taken off by pipe 13 and enriched sulfolane, now at a temperature of approximately 150° F., is withdrawn by pipe 14 and pumped by pump 15 and pipe 16 by way of heat exchanger 17' and pipe 18 to stripper 19. The stripper bottom is operated at approximately 200° F. and is in this embodiment heated by way of a steam reboiler. Overhead from the stripper column is taken by pipe 20 and consists largely of carbon dioxide, a side stream 21 is taken off below the point of feed and consists essentially of substantially pure sulfur dioxide which can be cooled as in cooler condenser 22 and passed by pipe 23 to direct loading into tank car 24 to be used as desired. Bottoms from stripper 19 are passed by pipe 25 and pump 26 and pipe 17, cooler 11 and pipe 12 into absorption column 10 for use as earlier described. A portion or all of the sulfolane bottoms from the stripper can be intermittently or continuously, and preferably is continuously, passed by pipe 27, heat exchanger 28 and pipe 29 into sulfolane regenerator unit 30. In the unit 30, the sulfolane is heated to a temperature of approximately 250° F. and removed by pipe 31, pump 32 and passed by pipe 33, heat exchanger 28 and pipe 34 into pipe 17 for use as earlier described. Water is taken overhead from unit 30 by way of pipe 35. Some heat can be recovered therefrom at heat exchanger 36, any remaining vapors cooled by cooler 37 and the thus cooled effluent overhead passed by pipe 38 to drum 39 from which vapors can be vented at 40 and water removed at 41. This water can be used for further quenching. The following table shows the composition of the stack gases before and after water quench and compression, mol percent:

TABLE I

| | Pipe | |
|---|---|---|
| | 5 | 9 |
| SO₂ | 0.2 | 0.2 |
| CO₂ | 14.3 | 12.4 |
| N₂ | 74.2 | 64.3 |
| H₂O | 11.3 | 23.1 |

A turbo-compressor 42 compresses the sulfur dioxide to a pressure of approximately 85 pounds per square inch and this sulfur dioxide which has been compressed and cooled and therefore liquified can be discharged into the tank car 24 as earlier noted. According to the invention, heat of compression can be recovered, further rendering the process even more economical. This heat can be used to pre-heat boiler water or the fuel oil as may be desired.

One skilled in the art having this disclosure before him and having studied the same will understand that alterations or modifications can be made in the schematic here disclosed. He will also understand that temperatures and pressures given are those now preferred. Depending upon different fuels, sulfur contents and economic studies as effected by changing conditions, different temperatures, pressures and/or flow rates or other conditions will be within the scope of the claims.

If desired (not shown), the gaseous stream 13 which will contain sulfolane, is about equilibrium quantity, can be water-washed to recover sulfolane, and the water solution of sulfolane can be charged to regenerator 30 for further recovery of sulfolane.

Specific Example

| | |
|---|---:|
| (1) Fuel oil, barrels/day | 3,500 |
| Sulfur, wet. percent | 3 |
| (5) Flue gas, std. cu. ft./hour | 9,500,000 |
| Composition, mol percent: | |
| $SO_2$ | 0.2 |
| $CO_2$ | 14.3 |
| $N_2$ | 74.2 |
| $H_2O$ | 11.3 |
| Temperature, °F. | 500 |
| Pressure, p.s.i.a. (atmospheric) | 14.7 |
| (5') Quench water, gallons/minute | 140 |
| Temperature, °F. | 80 |
| (6) Quenched flue gas, s.c.f./hour | 11,000,000 |
| Composition, mol percent: | |
| $SO_2$ | 0.17 |
| $CO_2$ | 12.40 |
| $N_2$ | 64.33 |
| $H_2O$ | 23.10 |
| Temperature, °F. | 150 |
| Pressure, p.s.i.a. | 14.7 |
| (9) Compressed gases: | |
| Temperature, °F. | 160 |
| Pressure, p.s.i.a. | 16 |
| (12) Sulfolane (148° F.), g.p.m. | 35,600 |
| (23) Liquid sulfur dioxide (85 p.s.i.a., 100° F.), tons/day | 31.6 |
| (10) Absorber: | |
| Temperature, °F. | 150 |
| Pressure, p.s.i.a. (substantially) | 16 |
| (19) Stripper: | |
| Top temp., °F. | 190 |
| Bottom temp., °F. | 200 |
| Pressure, p.s.i.a. | 15 |
| (30) Regenerator: | |
| Pressure, p.s.i.a. | 14.7 |
| Bottom temp., °F. | 250 |

Although this specific stack gas has 0.17 mol percent $SO_2$, this may range, depending upon the sulfur content of the feed, from 0.01 to about 1.0 mol percent $SO_2$. The quantity of sulfolane used for $SO_2$ absorption will be decreased or increased in a proportionate manner, which can be easily determined in the laboratory.

The lean sulfolane 12 can have up to about 10 volume percent water therein, usually about 5 percent or less water is preferred.

The ranges of temperatures for absorber 10 can be about 100 to about 175° F. The pressure is only about one pound per square inch above atmospheric so that a simple fan (similar to those used in cooling towers) can be used to flow the gas. The quantity of flue gas is too large to afford movement by compressors.

The amount of quench water 5' can vary, depending upon the flue gas temperature and the temperature of the quench water itself, as well as the temperature desired of the quenched gases. The amount of quench can be easily calculated by persons versed in heat exchange.

Ranges of temperatures which can be used in the stripper can be about 180 to about 225° F. Again, the pressure used is slightly above atmospheric.

Since the pressure drop across the system is only about one pound per square inch, in a now preferred form of the invention the stack gases after having been cooled and compressed are subdivided and passed to a bank of sulfolane absorption tanks operated in parallel. Each tank can be thin metal or wooden and can contain three to six perforated trays, which trays can be thin metal or wood. In this manner, low pressure drop is effected, and very efficient $SO_2$ recovery is effected. This also provides greater flexibility of operation in that a small increase in the liquid sulfolane fed to each tray or unit will result in considerably increased capacity of absorption therein. Suffice to say with this kind of operation and the discovery that the sulfolane will very effectively sequester or absorb very small quantities of $SO_2$ from very large quantities of stack or flue gases, a very efficient operation can be performed.

Reasonable variation and modification are possible within the scope of the foregoing disclosure, the drawing and the appended claims to the invention, the essence of which is that there has been provided a method for the recovery of purified stack gases and sulfur dioxide based upon the concept that a sulfolane will substantially completely absorb from gases containing the same in a very small proportion sulfur dioxide and that this sulfur dioxide can be recovered from the sulfolane; the method in one of its embodiments comprising as described the quenching of the stack gases, their compression, their treatment with a sulfolane to absorb sulfur dioxide and some carbon dioxide unavoidably therefrom, and the stripping of the sulfolane to recover as separate streams carbon dioxide and sulfur dioxide with reuse of the sulfolane.

We claim:

1. A process for removal of small quantities of sulfur dioxide from stack gases containing of the order of about less than 1 mol percent of sulfur dioxide which comprises contacting said gases with an absorbent consisting essentially of a sulfolane.

2. A method according to claim 1 wherein the stack gases contain in addition to sulfur dioxide in a proportion of the order of about less than 1 mol percent a substantial proportion of carbon dioxide and these gases are contacted with an amount of a sulfolane sufficient to remove substantially completely the sulfur dioxide from said gases.

3. A method according to claim 2 wherein the gases are cooled to a temperature at which these gases can be effectively treated with a liquid sulfolane and wherein the liquid sulfolane containing sulfur dioxide and carbon dioxide is stripped in one operation to recover as a separate stream therefrom carbon dioxide and as another stream sulfur dioxide and the sulfur dioxide is recovered for use as desired.

4. A method according to claim 1 wherein the stack gases are quenched with water to cool the same to a temperature at which the gases can be compressed, the gases are then compressed to a pressure above atmospheric, the thus compressed gases are then contacted intimately with sulfolane in a quantity sufficient to remove therefrom sulfur dioxide and unavoidably some carbon dioxide, the enriched sulfolane thus obtained is then stripped by heating to recover therefrom in one operation as a separate stream carbon dioxide and as another stream sulfur dioxide, the sulfur dioxide is recovered as a product of the operation and sulfolane, thus recovered, is returned for further use in the operation.

5. A method according to claim 1 wherein the stack gases are obtained at a temperature of the order of approximately 500° F., they contain sulfur dioxide of the order of a few tenths of one percent, these gases are water quenched to a temperature of the order of about 150° F., the gases are then compressed to a pressure of the order of about 16 pounds per square inch absolute, the compressed gases are then scrubbed with sulfolane at a temperature of the order of about 150° F., enriched sulfolane containing substantially all of the sulfur dioxide earlier contained in the gases is then heated and stripped to recover therefrom in one operation separate streams of carbon dioxide on the one hand and sulfur dioxide on the other and a stream of lean sulfolane which is reused in the operation.

6. A method according to claim 5 wherein at least a portion of the stripped sulfolane is treated to remove water therefrom.

7. A method according to claim 4 wherein the cooled compressed gases are subdivided and the several streams so obtained are passed respectively into each of a bank of sulfolane absorption tanks operated in parallel so as to obtain a low pressure drop and highly efficient absorption of the small quantity of sulfur dioxide in the stack gases.

References Cited

UNITED STATES PATENTS

| | | | |
|---|---|---|---|
| 1,946,489 | 2/1934 | De Jahn | 55—73X |
| 2,385,704 | 9/1945 | Hooker et al. | 23—178 |
| 2,810,627 | 10/1957 | Johnstone et al. | 23—2X |
| 3,039,251 | 6/1962 | Kamlet | 55—73X |
| 3,347,621 | 10/1967 | Papadopoulos et al. | 55—73X |
| 3,352,631 | 11/1967 | Zarker | 23—2 |

REUBEN FRIEDMAN, Primary Examiner

R. W. BURKS, Assistant Examiner

U.S. Cl. X.R.

55—73